United States Patent
Huang et al.

(10) Patent No.: US 10,204,370 B2
(45) Date of Patent: Feb. 12, 2019

(54) GROUP RECOMMENDATION FOR SELECTION OF SERVICE ITEMS

(71) Applicant: Telefonaktiebolaget LM Ericsson (publ), Stockholm (SE)

(72) Inventors: Vincent Huang, Sollentuna (SE); Erik Hallström, Leksand (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 437 days.

(21) Appl. No.: 15/032,117

(22) PCT Filed: Oct. 28, 2013

(86) PCT No.: PCT/EP2013/072509
§ 371 (c)(1),
(2) Date: Apr. 26, 2016

(87) PCT Pub. No.: WO2015/062623
PCT Pub. Date: May 7, 2015

(65) Prior Publication Data
US 2016/0321735 A1 Nov. 3, 2016

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06N 7/005* (2013.01); *G06N 99/005* (2013.01); *G06Q 10/101* (2013.01); *G06Q 30/02* (2013.01)

(58) Field of Classification Search
CPC ........... G06Q 30/0631; G06Q 30/0269; G06Q 30/0254
(Continued)

(56) References Cited

U.S. PATENT DOCUMENTS 8,732,101 B1* 5/2014 Wilson .................. G06N 3/063
706/15
2011/0270774 A1* 11/2011 Varshavsky ............ G06Q 10/10
705/319
(Continued)

OTHER PUBLICATIONS

Seo et al., "Movie recommendation with K-means clustering and Self-Organizing Map methods," Inst. For Syst. And Technol. of Inf. Control and Commun., Sep. 10, 2010.*
(Continued)

*Primary Examiner* — Brandy A Zukanovich
(74) *Attorney, Agent, or Firm* — Sage Patent Group (57) ABSTRACT

The present disclosure provides enhanced group recommendation for selection of a service item with respect to a service class, and communicates the enhanced group recommendation to a sub-group of service users. Initial service scores for service items in the service class are generated by aggregating individual service preferences of sub-group members with respect to the service class. Group preferences for service items in the service class are then predicted using statistic data on previous service selections of sub-group members with respect to the service class. The initial service scores are aggregated with the predicted group preferences to generate of weighted service scores with respect to service items in the service class. One of the service items in the service class that has the highest weighted score is the group recommendation is communicated to the sub-group members.

10 Claims, 5 Drawing Sheets

(51) Int. Cl.
  *G06Q 10/10* (2012.01)
  *G06Q 30/02* (2012.01)
  *G06N 7/00* (2006.01)
  *G06N 99/00* (2010.01)
(58) Field of Classification Search
  USPC .............................................. 705/26.1, 27.1
  See application file for complete search history.

(56) References Cited

U.S. PATENT DOCUMENTS

| | | |
|---|---|---|
| 2012/0245887 A1 | 9/2012 | Spears et al. |
| 2012/0278252 A1* | 11/2012 | Sethna ............... G06Q 30/0254 705/347 |
| 2014/0067596 A1* | 3/2014 | McGovern ............ G06Q 30/02 705/26.7 |

OTHER PUBLICATIONS

International Search Report and Written Opinion of the International Searching Authority, Application No. PCT/EP2013/072509, dated Dec. 12, 2013.

* cited by examiner

GROUP RECOMMENDATION FOR SELECTION OF SERVICE ITEMS

CROSS REFERENCE TO RELATED APPLICATION

This application is a 35 U.S.C. § 371 national stage application of PCT International Application No. PCT/EP2013/072509, filed on Oct. 28, 2013, the disclosure and content of which is incorporated by reference herein in its entirety. The above-referenced PCT International Application was published in the English language as International Publication No. WO 2015/062623 A1 on May 7, 2015.

TECHNICAL FIELD

The present invention relates to a method of providing a group recommendation for selection of a service item with respect to a service class to a sub-group of service users, and further to a network node implementing the group recommendation according to the present invention.

BACKGROUND

In today's society an activity is normally performed among a group of people. Such activity may be, e.g., movie watching or dining. Given a list of service items and each user's preference for the service items in the list, a group recommendation can be performed.

Traditional approaches to provide group recommendations combine user preferences in the user group by using one or more score aggregation techniques such as average, least-misery, greatest pleasure, average pair-wise disagreement etc. These approaches all work by first calculating estimated ratings for each service user and service item and by then using a formula to aggregate ratings of the service users in the user group.

However, normally different people have different influences on the choice of the group recommendation. Here, the problem is to find out how much each individual in the group can influence the choice and how to capture the group dynamics of the service selection.

In view of the above, the problem underlying the present invention is to enhance the group recommendation by capturing previous user selections.

SUMMARY

According to a first aspect of the present invention, there is provided a method of providing a group recommendation for selection of a service item with respect to a service class to a sub-group of service users. The method comprises the step of generating initial service scores for service items in the service class by aggregating individual service preferences of sub-group members with respect to the service class. The group preferences for service items in the service class are predicted on the basis of statistic data on previous service selections of sub-group members with respect to the service class. Then initial service scores are aggregated with the predicted group preferences for generation of weighted service scores with respect to service items in the service class. Finally, the service item in the service class with highest weighted score is forwarded as group recommendation to the sub-group members.

According to a second aspect of the present invention, there is provided a network node for providing a group recommendation for selection of a service item with respect to a service class to a sub-group of service users in a wireless communication network. The network node comprises at least one interface to establish a transmission link, at least one processor, and a memory comprising instructions to be executed by the at least one processor. Thereby, the network node is adapted to generate initial service scores for service items in the service class by aggregating individual service preferences of sub-group members with respect to the service class, to predict group preferences for service items in the service class on the basis of statistic data on previous service selections of sub-group members with respect to the service class, to aggregate initial service scores with the predicted group preferences for generation of weighted service scores with respect to service items in the service class, and to forward, via at least one interface, the service item in the service class with highest weighted score as group recommendation to the sub-group members.

According to a third aspect of the present invention, there is provided a computer program which, when being executed by at least one processor of a network node, causes the network node to execute a method according to the first aspect of the present invention.

According to a fourth aspect of the present invention, there is provided a computer program product, comprising program code to be executed by at least one processor of a network node, thereby causing the network node to execute a method according to the first aspect of the present invention.

BRIEF DESCRIPTION OF DRAWINGS

In the following, the present invention will be explained with respect to the drawing in which.

DETAILED DESCRIPTION

Figure 1:
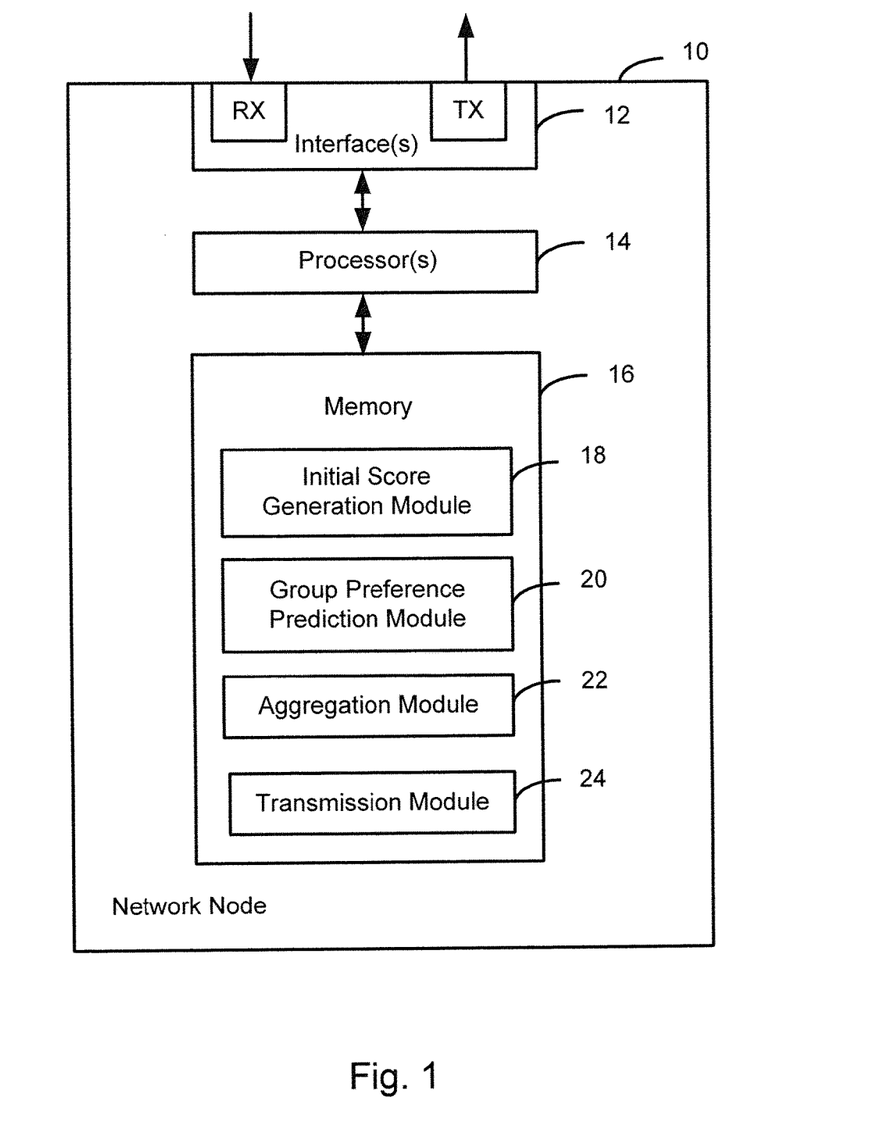
FIG. 1 shows a schematic diagram of a network node for providing a group recommendation for selection of a service item with respect to a service class according to the present invention.

FIG. 1 shows a schematic diagram of a network node providing a group recommendation for selection of a service item with respect to a service class according to the present invention. It illustrates an exemplary structure which may be used for implementing the concepts underlying the present invention in a network node, e.g., a Node B, Radio Network Controller RNC or an eNodeB of a cellular network for delivery of a group recommendation for selection of service items to end users of the communication network.

As shown in FIG. 1, the network node 10 may include at least one interface 12, e.g., a radio interface. The interface 12 is suitable for wireless information exchange, e.g., with a user terminal such as a cellular phone. In some scenarios, the interface 12 may also be used for exchanging information with a further network node, e.g., a RNC in a wireless network. Alternatively, the network node 10 may comprise a further suitable interface configured for communication with a further network node. RX represents a receiving capability of the at least one interface 12, and TX represents a sending capability of the at least one interface 12.

As shown in FIG. 1, the network node 10 comprises at least one processor 14 coupled to the interface 12 and a memory coupled to the processor(s) 14. The memory 16 may include a read-only memory ROM, e.g., a flash ROM, a random access memory RAM, e.g., a dynamic RAM DRAM or a static RAM SRAM, a mass storage, e.g., a hard disc or solid state disc, or the like. The memory 16 also includes instructions, for example suitably configured program code to be executed by the processor(s) 14 in order to implement a later described functionality of the network node 10. This functionality will be referred to in the following as modules. It is noted that these modules do not represent individual hardware elements of the network node 10, but rather represent functionalities generated when the one or more processors 14 execute the suitably configured program code.

As shown in FIG. 1, the memory 16 may include suitably configured program code to implement an initial score generation module 18, a group preference prediction module 20, an aggregation module 22, and a transmission module 24. Further, the suitably configured program code in the memory may also implement a control module for implementing various control functionalities, e.g., for controlling the network node 10 as to establishing and/or maintaining radio links, or the like.

Figure 2:
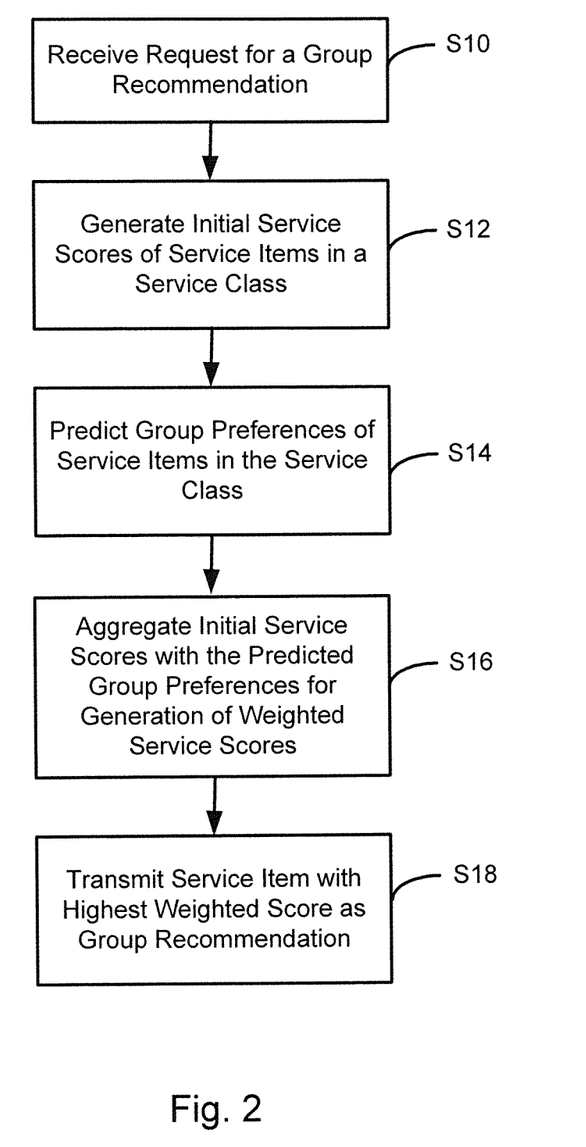
FIG. 2 shows a schematic diagram of operation of the network node according to FIG. 1.

FIG. 2 shows a flowchart of operation for the network node 10 as shown in FIG. 1.

As shown in FIG. 2, initially there is executed a step S10 by the interface(s) 12 to receive a request for a group recommendation. According to one example the request may be related to a service item being related to a particular service class, e.g., a service class of restaurant services, cinema services, live streaming services, gaming services, etc. A service item may correspond to an individual example included in the associated service class. An example of a service item may correspond to dining in a particular restaurant. Here, it should be noted that the step S10 may be optional if the request for a group recommendation is already pre-stored in the network node 10.

As shown in FIG. 2, then follows a step S12 operatively being executed by the initial score generation module 18 in cooperation with the processor(s) 14, to generate initial service scores for service items in the service class by aggregating individual service preferences of sub-group members with respect to the service class.

As shown in FIG. 2, then follows a step S14 operatively being executed by the group preference prediction module 20 in cooperation with the processor 14, to predict group preferences for service items in the service class. According to one example, the prediction is based on statistic data on previous service selections of sub-group members with respect to the service class.

As shown in FIG. 2, then follows a step S16 operatively being executed by the aggregation module 22 in cooperation with the processor(s) 14, to aggregate initial service scores with the predicted group preferences for generation of weighted service scores with respect to service items in the service class.

As shown in FIG. 2, then follows a step S18 operatively being executed by the transmission module 22 in cooperation with the interface(s) 12 to forward the service item in the service class with highest weighted score as group recommendation to the sub-group members.

In conclusion, according to the present invention there is performed a traditional group recommendation in the first place. The traditional group recommendation uses standard aggregation techniques of each user's individual preferences, for example those aggregation techniques described with respect to the background of the present invention.

Further, according to the present invention a prediction of service items in a service class is generated using given historical selection of different user groups, in order to obtain weights reflecting how the rating of each service item is affected by a user group dynamics. The weights are then used to modify the result from the traditional group recommendation.

Overall, the present invention allows to take into account each individual's influence on the selection and to capture the group dynamics underlying the selection.

Figure 3:
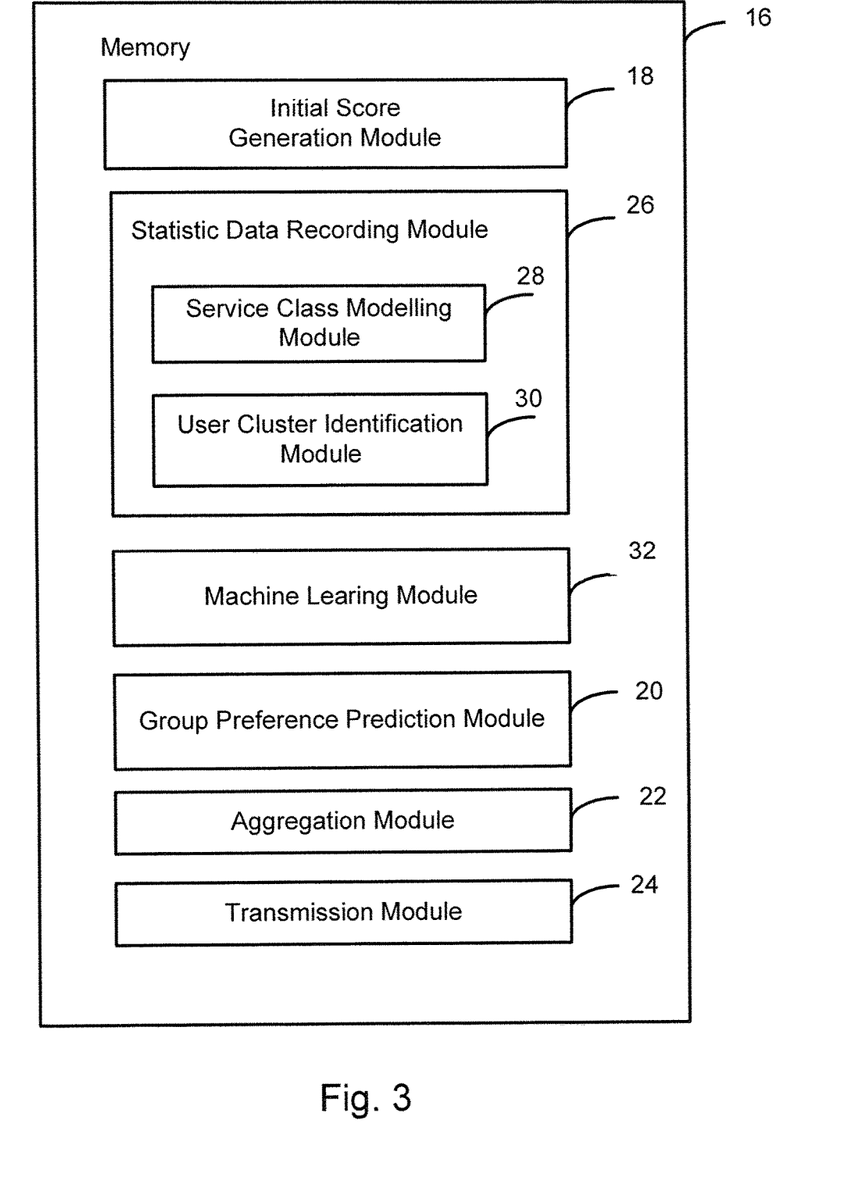
FIG. 3 shows a further detailed schematic diagram of the memory shown in FIG. 1.

FIG. 3 shows a further detailed schematic diagram of the memory 16 shown in FIG. 1. It explains a more detailed structure for implementing the concepts according to the present invention in the network node 10.

As shown in FIG. 3, in addition to the initial score generation module 18, the group preference prediction module 20, the aggregation module 22, and transmission module 26 already explained with respect to FIG. 1, the memory 16 also comprises a statistic data recording module 26 dividing, according to an example of the present invention, at least into a service class modeling module 28 and a user cluster identification module 30 and a machine learning module 32. Also, in the network node 10 the different modules are implemented by use of the processor 14 in cooperation with the memory 16 to deliver a weighted group recommendation for service selection from a service class. It should be understood that the respective modules according to the present invention are not limited to represent separate hardware elements, but are merely illustrated as separate modules for understanding the various functionalities of the at least one processor 14.

Figure 4:
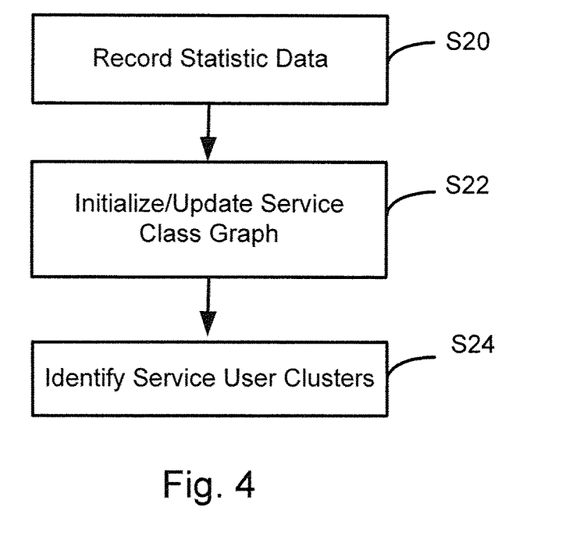
FIG. 4 shows a flowchart of operation according to an implementation of the statistic data recording module shown in FIG. 3.

FIG. 4 shows a flowchart of operation according to an implementation of the statistic data recording module 26 shown in FIG. 3.

As shown in FIGS. 3 and 4, the at least one processor(s) 14 and the memory 16 implement the statistic data recording module 26 adapted to collect statistic data with respect to service usage through different service users over time. As explained above, the statistic data recording module 26 comprises at least a service class modeling module 28 and a user cluster identification module 30.

As shown in FIG. 4, for the purpose of statistic data recording initially there is executed a step 20 operatively being executed by the service class modeling module 28 in cooperation with the processor(s) 14, to record statistic data on previous service selections of sub-group members with respect to a plurality of service classes and a plurality of sub-groups of service users.

As shown in FIG. 4, subsequent there is executed a step 22 operatively being executed by the service class modeling module 28 in cooperation with the processor(s) 14, to model each service class using a service class graph. Here, nodes in the service class graph model users that selected at least one service item in the service class and edges in the service class graph model users that used the at least service item in the service class together.

As shown in FIG. 4, subsequent to statistic data collection there is executed a step S24 operatively being executed by the user cluster identification module 30 in cooperation with the processor(s) 14, to identifying a plurality of connected node subsets in the service class graph. In step S24 different connected node subsets being connected by at least one edge are iteratively merged until only disjoint subsets model user clusters.

As shown in FIGS. 1 and 3, the at least one processor(s) 14 and the memory 16 implement the machine learning module 32 adapted to train a prediction module relied on by the group preference prediction module 20 shown in FIG. 1. For the purpose of training a prediction module there is executed a training of the prediction module with respect to the service class by applying a machine learning algorithm to the recorded statistic data to calculate probabilities that a new sub-group of service users will select service items in the service class as related group preferences.

Figure 5:
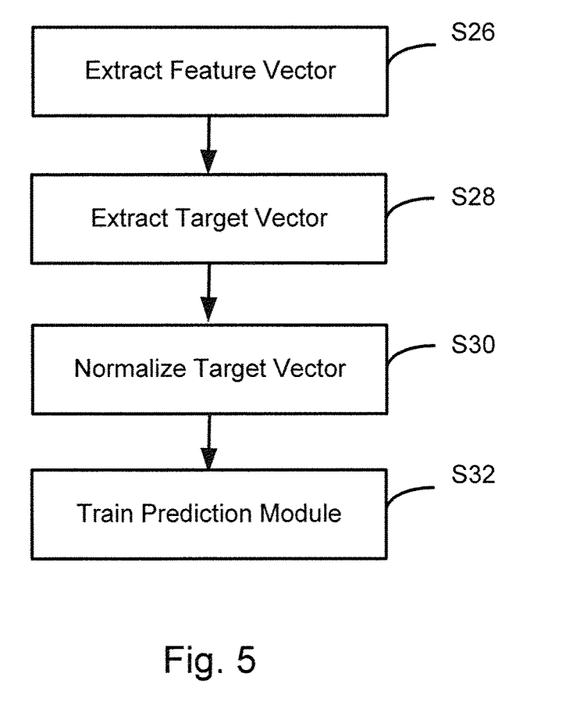
FIG. 5 shows a flowchart of operation according to an implementation of the machine learning module shown in FIG. 3.

FIG. 5 shows a flowchart of operation according to an implementation of the machine learning module 32 shown in FIG. 3.

In the following it is assumed without any limitation of the scope of the present invention that the set of users is $U=\{u1, u2, \ldots, un\}$, the set of service items is $\{i1, i2, \ldots, im\}$, the subsets modeling user clusters are $\{C1, C2, \ldots, Ck\}$ with $Ci \in U$, and the number of times the cluster $Ci$ has consumed service item $j$ is $N(j, Ci)$.

As shown in FIG. 5, for the purpose of training a prediction model there is executed a step S26 operatively being executed by the machine learning module 32 in cooperation with the processor(s) 14 to extract a feature vector $Xi$ for each cluster $Ci$ as $X=\{bool(u1 \in E\ Ci\}, bool(u2 \in Ci\}, \ldots, bool(un \in Ci)\}$ with $bool(A)=1$ when statement A is true. In this respect, the term "feature vector" may particularly denote a vector representing characteristics of an input object for the machine learning module 32.

As shown in FIG. 5, then there is executed a step S28 operatively being executed by the machine learning module in cooperation with the processor(s) 14, to extract a target vector $Yi=\{N(i1, Ci), N(i2, Ci), \ldots, N(im, Ci)\}$ for each cluster $Ci$. In this respect, the term "target vector" may particularly denote a vector representing characteristics of an output for the machine learning module 32.

As shown in FIG. 5, then there is executed a step S30 operatively being executed by the machine learning module 32 in cooperation with the processor(s) 14, to normalize the target vector $Yi$ using a L1 norm. In this respect, the term "L1 norm" may particularly denote a normalization of a vector which may comprise complex entries by summing absolute values of each entry.

As shown in FIG. 5, then there is executed a step S32 operatively being executed by the machine learning module 32 in cooperation with the processor(s) 14, to training the prediction module to map the feature vector $Xi$ to the normalized target vector $Yi$ by applying the machine learning algorithm. Here, it should be noted that according to the present invention, the machine learning algorithm may be of the type artificial neural network or random forest. However, it should be understood that according the present invention any other suitable training algorithm is as well applicable for set-up of a prediction model to be used by the group preference prediction module 20.

Assuming that a prediction module has been trained by the machine learning module 32 as outlined above, the step S14 shown in FIG. 2 for prediction of group preferences of service items in a service class may be further explained as follows.

Let the sub-group of users be $SG=\{sgu1, sgu2, \ldots, sgul\}$, and the service items in the service class be $SIC=\{si1, si2, \ldots, sir\}$. Then the step S14 of predicting group preferences for service items in the service class being executed by the group preference prediction module 20 in cooperation with the processor(s) 14 comprises extracting a feature vector XSG for the sub-group of service users as $XSG=\{bool(u1 \varepsilon\ SG), bool(u2 \varepsilon\ SG), \ldots, bool(un \varepsilon\ SG)\}$ and forwarding the extracted feature vector XSG for the sub-group of service users to the prediction module for output of predicted group preferences $PPC=\{pp1, pp2, \ldots, ppr\}$ with respect to service items in the service class.

Assuming that group preferences are predicted as outlined above, the step S16 shown in FIG. 2 for aggregation of initial service scored with the predicted group preferences for generation of weighted service scored may be further explained as follows.

Figure 6:
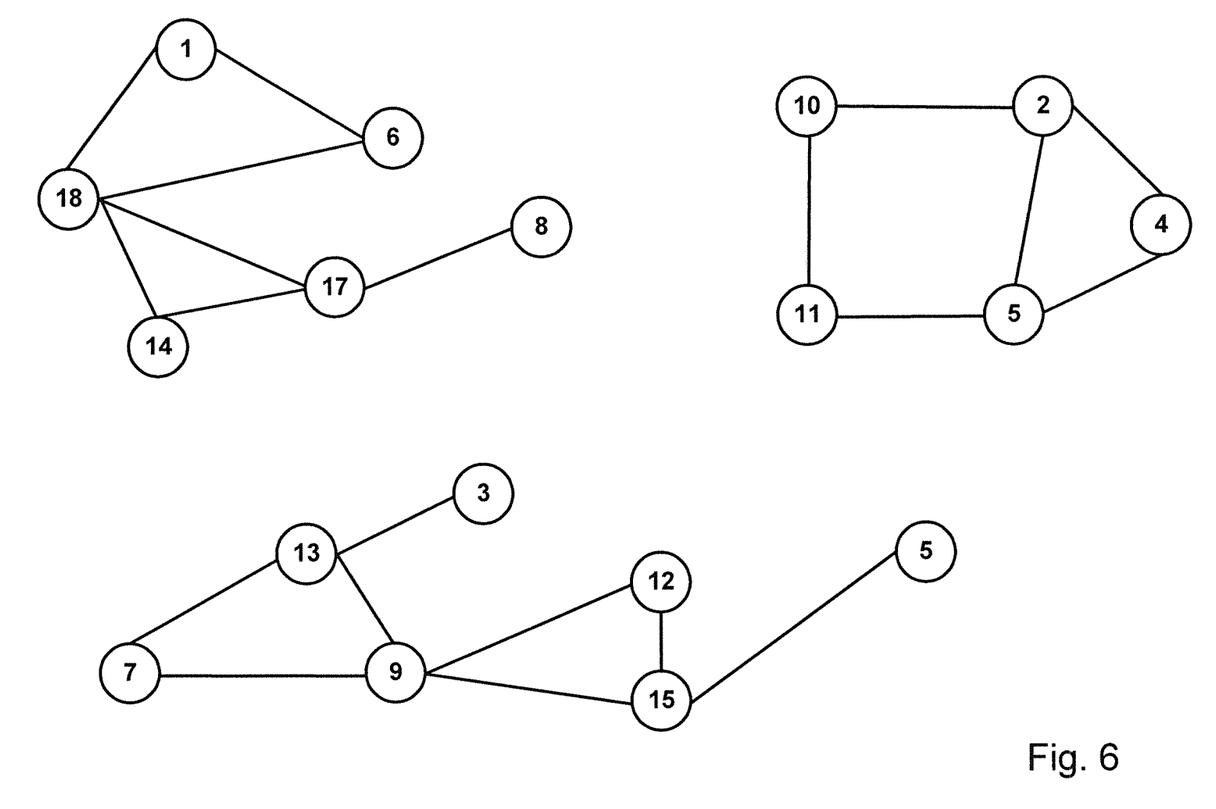
FIG. 6 shows an example of application of the present invention with respect to generation of a group recommendation for selection of a restaurant.

Let the initial service scores for service items $\{si1, si2, \ldots, sir\}$ in the service class SIC be $ISC=\{i\_score(si1, SG), i\_score(si2,SG), \ldots, i\_score(sir, SG)\}$. Then the step S16 of aggregating initial service scores with the predicted group preferences for generation of weighted service scores is executed by the aggregation module 22 in cooperation with the processor(s) 14 according to:

$WSC=\{(1+pp1)*i\_score(si1,SG),(1+pp2)*i\_score(si2, SG), \ldots, (1+ppr)*i\_score(sir,SG)\}.$ Further, the aggregation module 22 will generate the group recommendation in cooperation with the processor 14 according to $\text{Max}\_i\{(1+pp1)*i\_score(si1,SG),(1+pp2)*i\_score(si2, SG), \ldots, (1+ppr)*i\_score(sir,SG)\}.$ FIG. 6 shows an example of application of the present invention with respect to generation of a group recommendation for selection of a restaurant, for example for lunch.

Considering a group recommendation for restaurants, the number of restaurants is fixed. However, a variance of the dishes can be very large. The approach according to the present invention divides into two parts.

The first part is to analyze the words in the menus of each restaurant to match with each individual user's preferences separately. The results are scores for each menu and restaurant which provide the menu. The first step of generating an initial group score is accomplished by combining the scores from all members in the group using one or several known methods, such as average, least misery, or most pleasure, etc. To realize this step, user ratings for each dish are recorded either implicitly or explicitly. The user preference can be derived, e.g., from the words describing each dish.

The second step is to capture the group dynamics. The task is to represent a group as a vector, and predict the preferred restaurant based on the group dynamics. Assume, as explained above, that all users are nodes and edges between any two users symbolizes whether they both have been in a group eating lunch together. It would be reasonable to think that all users in a connected graph could eat together.

Given that there are 18 users, with internal IDs 1 to 18, assume that the following groups have had lunch together: $\{1, 6, 18\}, \{18, 14\}, \{18, 17\}, \{17, 14\}, \{17, 8\}, \{7, 13, 9\}, \{13, 3\}, \{9, 15, 12\}, \{15, 16\}, \{10, 2, 11\}, \{5, 2, 11\}$ and $\{5, 4, 2\}$. Any two of these sets which have an intersection, i.e. at least a number in common, is then combined into the same group. This is done iteratively until only a number of disjoint sets exits, called user clusters. This method is known as set consolidation.

As shown in FIG. 6, the groups mentioned above are combined into three such disjoint user clusters, $\{1, 6, 18, 14, 17, 8\}, \{3, 13, 7, 9, 12, 15, 16\}, \{10, 2, 11, 5, 4\}$. For each of these groups a probability predictor is trained. The input is a binary vector of which people are in the group. Each person's position in this binary vector is fixed after the group combination has been performed. An example of this feature vector with respect to each of the three different user clusters is as follows:

{1, 6, 18} in group 1 is [1, 1, 1, 0, 0, 0];
{9, 12, 15} in group 2 is [0, 0, 0, 1, 1, 1, 0]; and
{5, 4, 2} in group 3 is [0, 1, 0, 1, 1].

For each group, the numbers of visits to each restaurant is normalized and used as the outputs of model training. Considering ten restaurants, the group {1, 6, 18} visited restaurant one 5 times and restaurant five 3 times and restaurant 9 2 times. The output is then {0.5, 0, 0, 0, 0.3, 0, 0, 0, 0.2, 0}.

Further, to train a probability prediction model which is a regression task, we can use for example a neural network with one hidden layer and ten nodes. With the trained model, we can predict for example a group {1, 6, 14} which has not been seen before. Here, the goal is that the prediction model will generalize well if a group that has never been seen before is shown to the system. As far as the users are the same, it is possible to predict the preference of any group combinations.

Thus, the predicted weights can be used to modify the scored obtained from step one. The second step requires the recording of all group combinations and their selection in the past. The historical data is then fed into a feature extraction module to extract training samples and a machine learning module to generate the prediction module. These steps can be done offline periodically and store the trained module in the system for online prediction.

Overall, from the above example it may be understood that according to the present invention consumption monitoring serves to collect user history of user groups. Further, user learning uses implicit and/or explicit user rating to derive user preferences and to give a recommendation for each user. Group learning serves to learn group dynamics and to give recommendations for new user groups. Then, user recommendation and group recommendation are combined to give a final group recommendation.

Further, the calculation of individual ratings with respect to service items relies on previous ratings or user defined preferences, e.g., as reflected by user profiles. After ratings have been estimated they are aggregated in a standard group recommendation algorithm, e.g., so as to combine user profiles to create a group profile for output of an initial group recommendation.

Further, the training of the machine learning algorithm with previous selections leads to estimated probabilities of service items selections for any new group combination by consolidation of user groups, prediction of service weights for existing or new groups, and by combining the initial group recommendation with predicted service weights.

It is noted that although the invention is described above with respect to the network node 10 the concepts according to the invention can also be implemented in a wireless or wired communication network, wherein one or more functionalities of the network node 10 may be realized by different network nodes in the communication system, for example access network nodes or core network nodes, and/or network entities connectable to the communication network, for example terminals. Further, associated information exchange may be provided between the involved nodes and/or entities in order to provide the respective node or entity implementing a certain functionality with required input information.

Further to the above, according to another example of the present invention there is provided a computer program product directly loadable into the internal memory of the processor of the network node comprising software code portions for performing the inventive process when the product is run on the processor of the network node.

Therefore, the present invention is also provided to achieve an implementation of the inventive method steps on computer or processor systems. In conclusion, such implementation leads to the provision of computer program products for use with a computer system or more specifically a processor comprised in e.g., the network node.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard disk drives; or information convey to a computer/processor through communication media such as network and/or telephone networks via modems or other interface devices. It should be understood that such media, when carrying processor readable instructions implementing the inventive concept represent alternate examples of the present invention.

While in the above, the present invention has been described with reference to the drawings and figures, it should be noted that clearly the present invention may also be implemented using variations and modifications thereof which will be apparent and can be readily made by those skilled in the art without departing from the scope and spirit of the present invention. E.g., functionalities described above may be realized in software, in hardware, or a combination thereof.

Accordingly, it is not intended that the scope of claims appended hereto is limited to the description as set forth herein, but rather that the claims should be construed so as to encompass all features of presentable novelty that preside in the present invention, including all features that would be treated as equivalent thereof by those skilled in the art to which the present invention pertains.

The invention claimed is:

1. A method by a network node of a wireless communication network for providing a group recommendation for selection of a service item with respect to a service class to a sub-group of service users, the method being performed by at least one processor in the network node to communicate the group recommendation to end users of the communication network and comprising the steps:

recording statistic data on previous service selections of sub-group members with respect to a plurality of service classes and a plurality of sub-groups of service users;

training a prediction module with respect to the service classes by applying a machine learning algorithm to the statistic data, which has been recorded, to calculate probability that a new sub-group of service users will select service items in the service class as related group preferences;

generating initial service scores for a specific sub-group of sub-group members and related service items in a corresponding service class by aggregating individual service preferences of the sub-group members with respect to the corresponding service class;

predicting, using the prediction module, group preferences for the related service items in the corresponding service class on the basis of statistic data on previous service selections of sub-group members with respect to the service class;

aggregating initial service scores with the predicted group preferences for generation of weighted service scores with respect to service items in the service class; and forwarding the service item in the service class with highest weighted score as group recommendation to the sub-group members.

2. The method according to claim 1, further comprising the step of recording statistic data on previous service selections comprises:

modeling each service class using a service class graph, wherein nodes in the service class graph model users that selected at least one service item in the service class and edges in the service class graph model users that used the at least service item in the service class together.

3. The method according to claim 2, further comprising the step of identifying service user clusters in the service class graph by:

identifying a plurality of connected node subsets in the service class graph;

iteratively merging different connected node subsets being connected by at least one edge until only disjoint subsets model user clusters.

4. The method according to claim 3, wherein the set of users is U={u1, u2, . . . , un}, the set of service items is {i1, i2, . . . , im}, the subsets modeling user clusters are {C1, C2, . . . , Ck} with Ci ε U, and the number of times the cluster Ci has consumed service item j is N(j, Ci), wherein the step of training the prediction module by applying a machine learning algorithm to the recorded statistic data comprises:

extracting a feature vector Xi for each cluster Ci as X={bool(u1 ε Ci), bool(u2 ε Ci), . . . , bool(un ε Ci)} with bool (A)=1 when statement A is true;

extracting a target vector Yi={N(i1, Ci), N(i2, Ci), . . . , N(im, Ci)} for each cluster Ci;

normalizing the target vector Yi using a L1 norm; and training the prediction module to map the feature vector Xi to the normalized target vector Yi by applying the machine learning algorithm.

5. The method according to claim 4, wherein the machine learning algorithm is of the type artificial neural network or random forest.

6. The method according to claim 4 wherein the sub-group of users is SG={sgu1, sgu2, . . . , sgul}, the service items in the service class are SIC={si1, si2, . . . , sir} and the step of predicting group preferences for service items in the service class comprises:

extracting a feature vector XSG for the sub-group of service users as XSG={bool(u1 ε SG), bool(u2 ε SG), . . . , bool(un ε SG)}; and forwarding the extracted feature vector XSG for the sub-group of service users to the prediction module for output of predicted group preferences PPC={pp1, pp2, . . . , ppr} with respect to service items in the service class.

7. The method according to claim 6, wherein the initial service scores for service items {si1, si2, . . . , sir} in the service class SIC are ISC={i_score(si1,SG), i_score(si2, SG), . . . , i_score(sir, SG)} and that the step of aggregating initial service scores with the predicted group preferences for generation of weighted service scores is determined according to:

$$WSC=\{(1+pp1)*i\_score(si1,SG),(1+pp2)*i\_score(si2, SG), \ldots ,(1+ppr)*i\_score(sir,SG)\}.$$

8. The method according to claim 7, wherein the group recommendation is determined according to:

$$\text{Max}\_i\{(1+pp1)*i\_score(si1,SG),(1+pp2)*i\_score(si2, SG), \ldots ,(1+ppr)*i\_score(sir,SG)\}.$$

9. A network node for providing a group recommendation for selection of a service item with respect to a service class to a sub-group of service users in a wireless communication network, the network node comprising at least one interface to establish a transmission link, at least one processor, and a memory comprising instructions, wherein the processor executes the instructions to perform operations comprising:

recording statistic data on previous service selections of sub-group members with respect to a plurality of service classes and a plurality of sub-groups of service users;

training a prediction module with respect to the service classes by applying a machine learning algorithm to the statistic data, which has been recorded, to calculate probability that a new sub-group of service users will select service items in the service class as related group preferences;

generating initial service scores for a specific sub-group of sub-group members and related service items in a corresponding service class by aggregating individual service preferences of the sub-group members with respect to the corresponding service class;

predicting, using the prediction module, group preferences for the related service items in the corresponding service class on the basis of statistic data on previous service selections of sub-group members with respect to the service class;

aggregating initial service scores with the predicted group preferences for generation of weighted service scores with respect to service items in the service class; and forwarding the service item in the service class with highest weighted score as group recommendation to the sub-group members.

10. A computer program product comprising a non-transitory computer readable storage medium storing instructions which, when executed by at least one processor of a network node, causes the at least one processor of the network node to perform operations comprising:

recording statistic data on previous service selections of sub-group members with respect to a plurality of service classes and a plurality of sub-groups of service users;

training a prediction module with respect to the service classes by applying a machine learning algorithm to the statistic data, which has been recorded, to calculate probability that a new sub-group of service users will select service items in the service class as related group preferences;

generating initial service scores for a specific sub-group of sub-group members and related service items in a corresponding service class by aggregating individual service preferences of the sub-group members with respect to the corresponding service class;

predicting, using the prediction module, group preferences for the related service items in the corresponding service class on the basis of statistic data on previous service selections of sub-group members with respect to the service class;

aggregating initial service scores with the predicted group preferences for generation of weighted service scores with respect to service items in the service class; and forwarding the service item in the service class with highest weighted score as group recommendation to the sub-group members.

\* \* \* \* \*